March 11, 1930.  J. DUMONT  1,750,394

TENONING CUTTER HEAD

Filed July 1, 1929  2 Sheets-Sheet 1

Inventor
Joseph Dumont
By Attorney

March 11, 1930.   J. DUMONT   1,750,394
TENONING CUTTER HEAD
Filed July 1, 1929   2 Sheets-Sheet 2
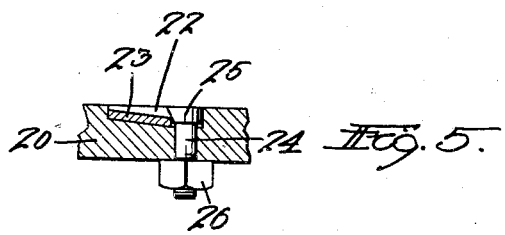
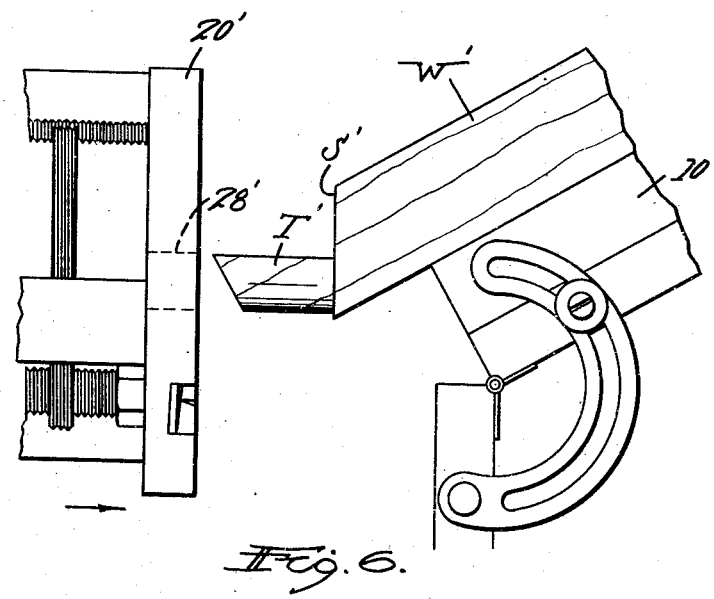

Patented Mar. 11, 1930

1,750,394

UNITED STATES PATENT OFFICE

JOSEPH DUMONT, OF GARDNER, MASSACHUSETTS

TENONING CUTTER HEAD

Application filed July 1, 1929. Serial No. 375,044.

This invention relates to a cutter head for use in forming tenons on pieces of wood, particularly parts of chairs and other furniture.

The principal objects of the invention are to provide a rotary cutter which will permit of feeding the strip of wood on which the tenon is to be made, into the cutting head in a direction at an angle to the axis of the head, thus permitting the formation of a straight tenon in alignment with the grain of the wood and the cutting of the end of the wood off at the base of the tenon on an angle; to provide a head which will cut more effectively than those in common use on account of the provision of three cutting knives; to provide an improved stop plate readily adjustable for determining the length of the tenon and to provide the whole head in a simple form consisting of few parts which, in addition to the particular use above described, can also be employed in the ordinary manner for providing a tenon at right angles to the end of the piece of wood.

Other objects and advantages of the invention will appear hereinafter.

Reference is to be had to the accompanying drawings in which

Fig. 5 is a sectional view on the line 5—5 of Fig. 2; and

Fig. 6 is a view similar to Fig. 1 showing the use of the cutter head to form a tenon in a different position.

Figure 1:
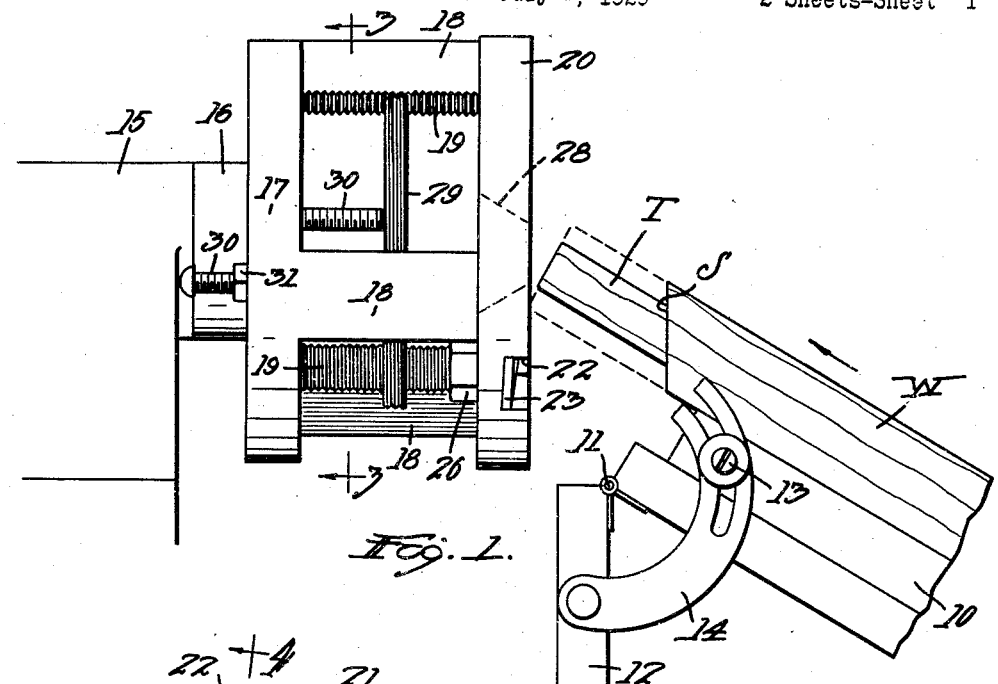
Fig. 1 is a side view of a preferred embodiment of the invention showing it as used for the particular purpose described above.
Figure 2:
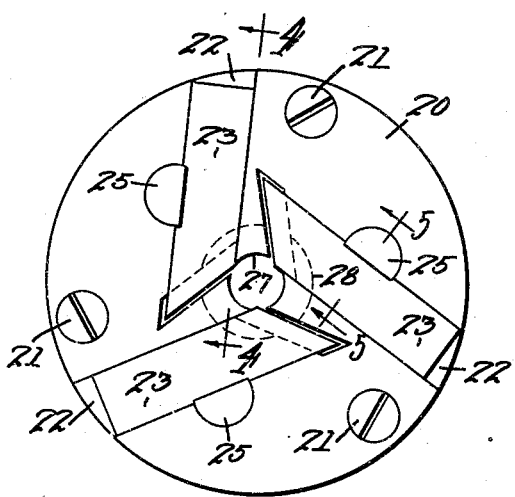
Fig. 2 is a front view of the head.
Figure 3:
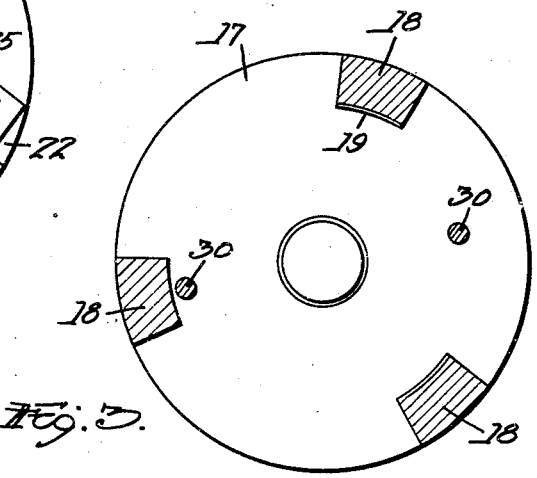
Fig. 3 is a sectional view of the head on the line 3—3 of Fig. 1.

The invention is shown as being used in Fig. 1 in a way in which the cutter head itself is mounted to rotate on a stationary axis and the piece of work W is mounted on a table 10. The table is hinged at 11 to a stationary upright 12 or other frame and a screw 13 and slotted arc-shaped support 14 are employed to hold the table in the inclined position that is required.

In this case the work W is moved along the table 10 and guided thereby in the direction of the arrow so as to enter the cutter and produce the tenon T as shown. The end of this tenon is perpendicular to the length of the work and the shoulder S is cut off at an angle and of course parallel to the face of the cutter.

Figure 4:
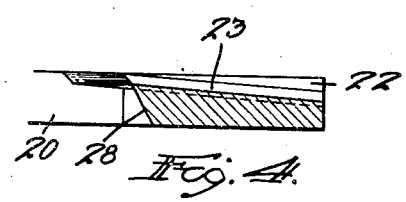
Fig. 4 is a sectional view on the line 4—4 of Fig. 2.

The cutter is mounted to rotate in a bearing 15 by means of a shaft, a collar 16 on which is shown, as located centrally with respect to the cutter frame 17. This cutter frame is circular in shape and has three posts 18, each one provided with a part of a screw thread 19 on its inner surface. On the ends of these posts is secured the cutter head 20 or face plate by screws 21. This head is provided with three grooves 22 in each of which cutter knives 23 are located. These knives are fixed by bolts 24 having heads 25, each provided with a slanting undercut surface, and held in position by nuts 26, as shown in Fig. 5. The grooves 22 in which the blades are located are at an angle to a plane, transverse to the axis of the cutter, as will appear from Fig. 4. At the center the face plate 20 is provided with a circular opening 27 which is of conical shape as indicated by the line 28.

The screw threads 19 hold a stop plate 29 which is provided with a screw thread around it so that it can be turned easily in these screw threads. On account of the posts 18 this frame is of skeleton form so that it is easy to get at this plate to turn it. Its adjustment is limited by stop screws 30 which are turned and held by check nuts 31 to limit the position of this stop plate.

In operation, the work is placed as indicated in Fig. 1, or at whatever angle is required, and moved bodily in the direction of the arrow into the opening 27. On account of the flaring sides 28 to this opening, the tenon as it is cut can move along through the opening 27 at such an angle as is shown and is intended to be pushed in until it engages the stop plate 29 which limits the length of the tenon.

It will be seen that at all times the shoulder S is being cut on the work by the knives and that it is located parallel to the face of the plate 20, thus a piece with a tenon and shoulder as shown in Fig. 1 is provided. By leaving the table set in the same place, any number of duplicate parts can be made and the tenons will be all the same length or a different length as required. The plate 29 is simply turned in one direction or the other to control the length of the tenon.

In Fig. 6 I have shown a way of forming the tenon on another piece of work by setting the table 10 at a different angle, holding the work on it stationary and feeding the cutter head 20' bodily forward. In this case there would be no object in having the conical surface 28 and a cylindrical passage 28' as shown. Of course the same cutter can be used in this case but it will have to be fed forward.

It will be seen that the arrangement shown in Fig. 1 provides a most convenient way of cutting a tenon with the grain of the wood which of course makes it stronger, and with the adjustments very simply and easily made.

Although I have illustrated and described only two forms of the invention, I am aware of the fact that other modifications can be made by any person skilled in the art without departing from the scope of the invention as expressed in the claims. Therefore, I do not wish to be limited to these exact forms, but what I do claim is:—

1. As an article of manufacture, a rotary cutter head for forming tenons, comprising a face plate having a plurality of grooves therein, cutting knives secured in said grooves, said face plate having a central perforation flared backwardly from the front face of the plate and means for supporting the work in a position at an angle to the axis of the cutter, whereby the work can be moved in its own plane into and through said central perforation, for the purposes described.

2. As an article of manufacture, a rotary cutter head for forming tenons, comprising a face plate having three grooves therein, three cutting knives secured in said grooves, said face plate having a central conical perforation and means for supporting work in a position at an angle to the axis of the cutter, whereby the work can be moved into and through said central perforation at an angle thereto, to form a tenon parallel with the grain of the wood.

3. In a cutter for the purposes described, the combination of a rotary cutter head having separated posts projecting therefrom in an axial direction and a cutter plate secured to the ends of said posts and having three knives located thereon, said cutter plate having a central passage with a conical surface inside the plate for the reception of a tenon located at an angle to its axis.

4. In a cutter for forming tenons and the like, the combination with a cutter head having posts spaced apart around the circumference and with a screw thread cut on their inner faces, of a cutter plate secured to the ends of said posts, having knives on its front face and a perforation through its center and an adjustable stop plate having an external screw thread fitting the threads on said posts for limiting the length of the tenon to be cut.

5. In a cutter for forming tenons and the like, the combination of a cutter head having posts spaced around the circumference and a screw thread on their inner faces, a cutter plate secured to the ends of said posts, knives on the front face of the cutter plate the cutter plate having a perforation through its center, a stop plate having an external screw thread fitting the threads on said posts for limiting the length of the tenon to be cut, a stop screw carried by the cutter head and engaging the back of the stop plate to determine its position, and means for holding the stop screw in adjusted positions.

In testimony whereof I have hereunto affixed my signature.

JOSEPH DUMONT.